US011967791B2

(12) United States Patent
Kawanishi

(10) Patent No.: US 11,967,791 B2
(45) Date of Patent: Apr. 23, 2024

(54) COAXIAL CONNECTOR

(71) Applicant: HOSIDEN CORPORATION, Osaka (JP)

(72) Inventor: Takahide Kawanishi, Osaka (JP)

(73) Assignee: HOSIDEN CORPORATION, Osaka (JP)

( * ) Notice: Subject to any disclaimer, the term of this patent is extended or adjusted under 35 U.S.C. 154(b) by 0 days.

(21) Appl. No.: 17/734,552

(22) Filed: May 2, 2022

(65) Prior Publication Data

US 2022/0368089 A1 Nov. 17, 2022

(30) Foreign Application Priority Data

May 11, 2021 (JP) ................................ 2021-080514

(51) Int. Cl.
*H01R 24/40* (2011.01)
*H01R 13/426* (2006.01)
*H01R 13/6584* (2011.01)

(52) U.S. Cl.
CPC ........... *H01R 24/40* (2013.01); *H01R 13/426* (2013.01); *H01R 13/6584* (2013.01)

(58) Field of Classification Search
None
See application file for complete search history.

(56) References Cited

U.S. PATENT DOCUMENTS

2016/0211614 A1* 7/2016 Yanase ............... H01R 13/6315

FOREIGN PATENT DOCUMENTS

EP 3336973 A1 6/2018
JP 2021-18948 A 2/2021

OTHER PUBLICATIONS

European Search Report dated Sep. 27, 2022 in EP 22171605.3.

* cited by examiner

*Primary Examiner* — Jean F Duverne
(74) *Attorney, Agent, or Firm* — Dilworth & Barrese, LLP

(57) ABSTRACT

A coaxial connector includes a plug and a receptacle that are electrically connectable to each other. The plug includes a first contact, a holder, a first tubular shell, and a shield member. The receptacle includes a second contact, a case, and a second tubular shell. The second contact includes a bottom portion, a pair of standing portions, and an extension. The pair of standing portions include respective contact portions having a wide shape and can clamp an end portion of the first contact. The extension includes a tip portion that is to be fixed to a substrate, a hold that is held by the case, and an elastic portion that is elastically deformable. The elastic portion can undergo elastic deformation in a direction orthogonal to a direction in which the contact portions extend.

20 Claims, 7 Drawing Sheets

COAXIAL CONNECTOR

CROSS REFERENCE TO RELATED APPLICATION

This application is based on and claims priority under 35 U.S.C. Section 119 to Japanese Patent Applications No. 2021-080514 filed on May 11, 2021, the entire content of which are incorporated herein by reference.

TECHNICAL FIELD

This disclosure relates to a coaxial connector that includes a plug and receptacle for electrical connection to each other.

RELATED ART

Conventionally, a coaxial connector that includes a receptacle electrically connected to a substrate and a plug electrically connected to the receptacle in a coaxial manner is known (e.g., see JP 2021-18948A).

The plug in the coaxial connector described in JP 2021-18948A includes a plug-side center contact, a plug-side insulator that supports the plug-side center contact inserted therein, and a conductive plug-side shell that covers the outer surface of the plug-side insulator. Also, the receptacle ("socket" in the document) in this coaxial connector includes a socket-side center contact, an insulating housing base portion and housing movable portion that accommodate the socket-side center contact, and a conductive socket-side shell that covers the outer surface of the housing base portion. If the plug and the receptacle are connected in a state of being misaligned relative to each other, the housing movable portion moves together with the socket-side center contact, and the socket-side shell comes into contact with the plug-side shell in a partial contact state.

SUMMARY

However, with the coaxial connector described in JP 2021-18948A, if the plug and the receptacle are misaligned relative to each other, the socket-side shell is in partial contact with the plug-side shell, and thus high frequency signals propagating through the contacts can easily leak, and the signal quality deteriorates. Also, the socket-side center contact may become twisted when the housing movable portion moves, and in such a twisted state, the contact load of the plug-side center contact and the socket-side center contact decreases, and it is difficult to secure electrical connection.

In view of this, there is demand for a coaxial connector that can stably secure electrical connection even if there is misalignment between the plug and the receptacle.

Means for Solving Problems

In view of the foregoing, in one embodiment, a coaxial connector includes a plug and a receptacle electrically connectable to each other, the plug including: a first contact that is electrically conductive and rod-shaped; a holder that is electrically insulating and supports the first contact inserted therein; a first tubular shell that is electrically conductive and covers an outer surface of the holder; and a shield member that is electrically conductive, that is in contact with the first tubular shell, and that is configured to shield the first tubular shell from external electromagnetic waves, and the receptacle including: a second contact that is electrically conductive, that is configured to be electrically connected to a substrate, and that is electrically connectable to the first contact coaxially; a case that is electrically insulating and accommodates the second contact; and a second tubular shell that is electrically conductive and covers an outer surface of the case, wherein the second contact includes: a bottom portion that faces the substrate; a pair of standing portions that are plate-shaped, stand on the bottom portion, and are close to each other; and an extension that has an inverted U shape and extends from the bottom portion to a position outward of a first one of the standing portions, the pair of standing portions include respective contact portions having a wide shape and configured to clamp an end portion of the first contact, the extension includes: a tip portion configured to be fixed to the substrate; a hold portion held by the case; and an elastic portion that is elastically deformable, and the elastic portion is elastically deformable in a direction orthogonal to a direction in which the contact portions extend.

According to this embodiment, the contact portions formed on the pair of standing portions of the second contact have a wide shape that can clamp the end portion of the first contact, and thus even if the plug and the receptacle are misaligned relative to each other in the extending direction of the contact portions, electrical connection between the first contact and the second contact can be secured. Also, the elastic portion in this configuration can elastically deform in a direction orthogonal to the extending direction of the contact portions, and therefore even if the plug and the receptacle are misaligned relative to each other in a direction orthogonal to the extending direction of the contact portions, the elastic portion undergoes elastic deformation, and electrical connection between the first contact and the second contact can be secured. Accordingly, even if the plug and the receptacle are misaligned in various directions, electrical connection between the first contact and the second contact can be reliably secured.

In this way, according to the coaxial connector of this embodiment, misalignment in the extending direction of the contact portions is absorbed by the wide shape of the contact portions, and misalignment in a direction orthogonal to the extending direction of the contact portions is absorbed by the elastic portion, and thus the second contact is not likely to become twisted, and the contact load can be stably ensured. Since this ensuring of the contact load is realized using the shape of the second contact, contact performance between the first tubular shell and the shield member does not degrade, and high frequency signals are not likely to leak. Accordingly, electrical connection can be stably secured even if there is misalignment between the plug and the receptacle.

In another embodiment, the elastic portion includes a portion through a notch in the first one of the standing portions.

According to the above embodiment, a portion of the elastic portion passes through the notch formed by cutting away a portion of one of the standing portions, and thus the coaxial connector can be made compact.

In another embodiment, the bottom portion of the second contact includes a bottom face that faces the substrate and that is located on a plane on which the tip portion of the extension is to be fixed to the substrate.

According to the above embodiment, the bottom face of the bottom portion of the second contact and the fixing surface of the tip portion of the extension are located on the same plane, and therefore even if the elastic portion undergoes deformation, the bottom portion of the second contact remains abutted against the substrate, and stress is not likely to be applied to the tip portion of the extension that is fixed to the substrate. Accordingly, electrical connection can be stably secured even if there is misalignment between the plug and the receptacle.

In another embodiment, the bottom face of the bottom portion of the second contact includes a hemispherical projection.

According to the above embodiment, the hemispherical projection is provided on the bottom face of the bottom portion of the second contact, and therefore the hemispherical projection slides smoothly on the substrate when the elastic portion undergoes elastic deformation, and it is possible to mitigate stress that is generated due to misalignment between the plug and the receptacle.

In another embodiment, the shield member includes: at least one first curved portion that is elastically deformable and curves outward; and at least one second curved portion that curves inward from the at least one first curved portion and is electrically connectable to the second tubular shell.

According to the above embodiment, the shield member of the plug that is in contact with the second tubular shell of the receptacle is provided with the elastically deformable first curved portion that curves outward, and the second curved portion that curves inward from the first curved portion and can be electrically connected to the second tubular shell. Accordingly, even if the first contact and the second contact are electrically connected in a state where the plug and the receptacle are misaligned relative to each other, the first curved portion flexibly deforms so as to maintain a state in which the second curved portion is entirely abutted against the second tubular shell. Accordingly, high shielding performance is ensured, thus preventing the problem of a reduction in signal quality due to the leakage of high frequency signals propagating through the contacts.

In another embodiment, the shield member includes a cylindrical portion in contact with the first tubular shell, and the at least one first curved portion includes a plurality of first curved portions each having a strip shape and extending from the cylindrical portion.

According to the above embodiment, the first tubular shell and the cylindrical portion of the shield member are brought into contact with each other, and the plurality of the first curved portions deform more flexibly due to extending from the cylindrical portion with strip-like shapes, and therefore the contact resistance between the shield member and the second tubular shell is uniform, and the durability of the coaxial connector can be improved.

In another embodiment, the at least one second curved portion includes a plurality of second curved portions being in a shape of strips and being continuous with the respective first curved portions, and a virtual circle circumferentially connecting respective innermost portions of the strips has a diameter smaller than an outer diameter of the cylindrical portion.

According to the above embodiment, the second curved portions also have a strip-like shape and are continuous with the respective first curved portions, and therefore the second curved portions deform along with the deformation of the first curved portions, and a larger area of contact between the shield member and the second tubular shell can be ensured. Moreover, the diameter of a virtual circle connecting the innermost portions of the strips in the circumferential direction is smaller than the outer diameter of the cylindrical portion, thus making it possible to appropriately ensure the contact load of the shield member and the second tubular shell while also achieving compactness for the coaxial connector.

In another embodiment, all of the second curved portions are constantly electrically connected to the second tubular shell.

According to the above embodiment, even in the case where the plug and the receptacle are misaligned relative to each other, if all of the second curved portions are constantly electrically connected to the second tubular shell, the shielding performance of the coaxial connector can be improved.

DESCRIPTION OF EMBODIMENTS

Figure 1:
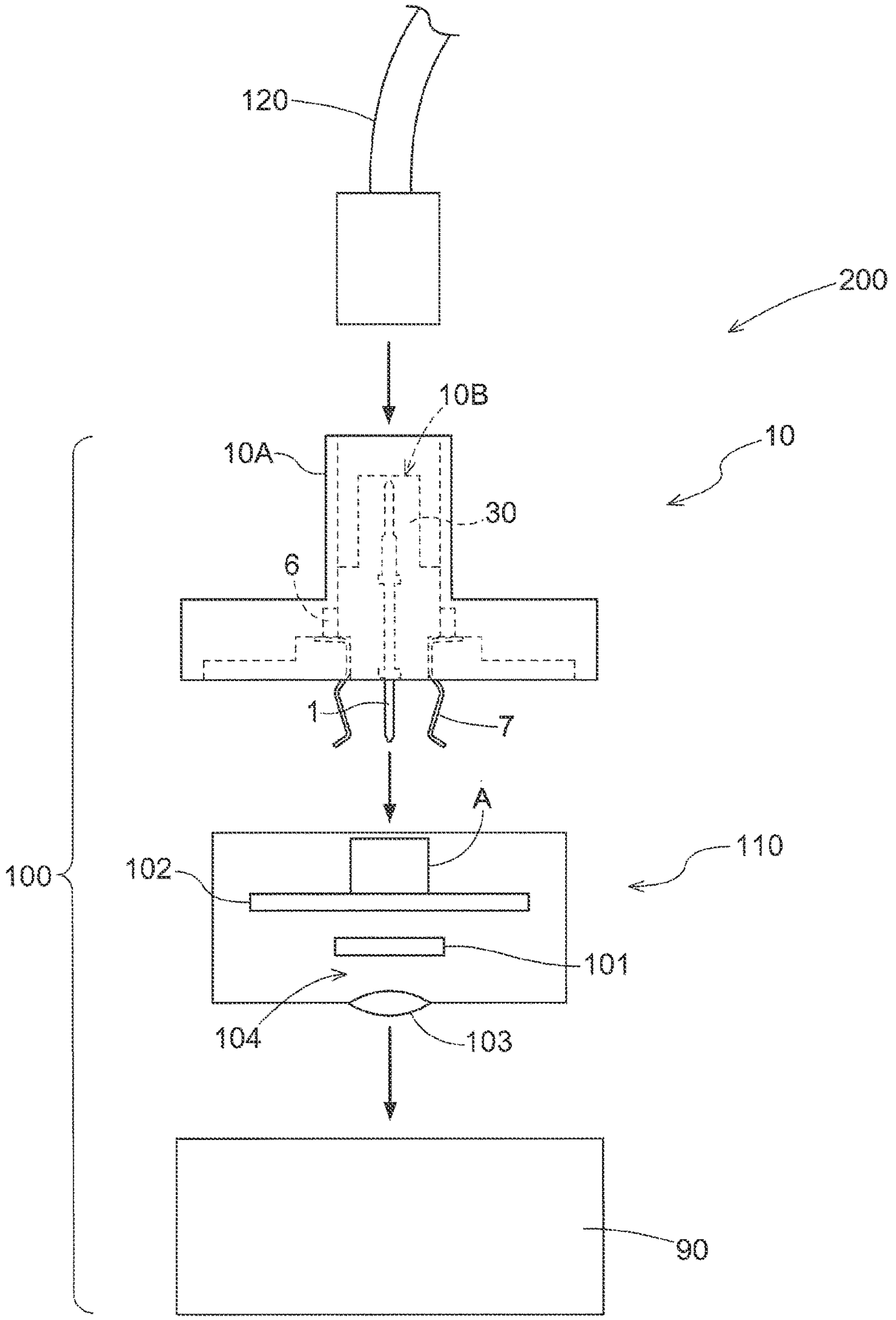
FIG. 1 is a diagram schematically showing a configuration of a camera unit (vehicle-mounted camera).

Hereinafter, embodiments of a coaxial connector 200 according to this disclosure will be described with reference to the drawings. As schematically shown in FIG. 1, a camera unit 100 (vehicle-mounted camera) for mounting to a vehicle includes a plug unit 10 that includes a plug 10B, and a camera module 110 that includes a receptacle A. The coaxial connector 200 in this embodiment includes the plug 10B and the receptacle A. However, the present invention is not limited to the following embodiments, and various modifications can be made without departing from the gist of the invention.

Overview

As shown in FIG. 1, the camera unit 100 includes the camera module 110 in which the receptacle A is included, the plug unit 10, and an insulating main body case 90 that is made of a resin or the like and accommodates the camera module 110. The camera module 110 includes at least an imaging element 101, a substrate 102 having mounted thereon an electronic circuit that drives and controls the imaging element 101 and processes a video signal output from the imaging element 101, and an optical system 104 including a lens 103 that condenses light onto the imaging element 101. The camera unit 100 can be used for applications other than in-vehicle use (e.g., mounting on a bicycle, a drone, or the like).

The camera unit 100 is electrically connected to an image processing device (not shown) or a monitor device (not shown) by a coaxial cable 120. The coaxial cable 120 is a cable having a structure in which an inner conductor and an outer conductor are arranged coaxially with a dielectric (insulator) interposed therebetween. The inner conductor transmits a signal, and the outer conductor functions as a shield that suppresses the influence of electromagnetic waves on the inner conductor. In this embodiment, the inner conductor supplies power from the image processing device or the monitor device to the imaging element 101 and the electronic circuit of the substrate 102 of the camera unit 100, and outputs a video signal, which is output from the imaging element 101 and the electronic circuit of the substrate 102, to the image processing device or the monitor device.

The imaging element 101 of the camera module 110 is a CCD (Charge Coupled Device) sensor or a CIS (CMOS Image Sensor). The number of lenses 103 is not limited to one, and a plurality of lenses 103 may be provided. The electronic circuit of the substrate 102 includes a clock driver for driving the imaging element 101, an A/D converter for converting an analog signal output from the imaging element 101 into a digital signal, and the like.

The substrate 102 is configured as a circuit board obtained by mounting electronic components on one or a plurality of printed circuit boards. In the case where there are a plurality of circuit boards, a flexible board may be used for electrical connection between the circuit boards. The receptacle A is mounted to the substrate 102 on which the electronic circuit is formed. The plug unit 10 is electrically connected to the receptacle A and also electrically connected to the coaxial cable 120, thus electrically connecting the electronic circuit of the substrate 102 to the coaxial cable 120.

Basic Configuration

Figure 2:
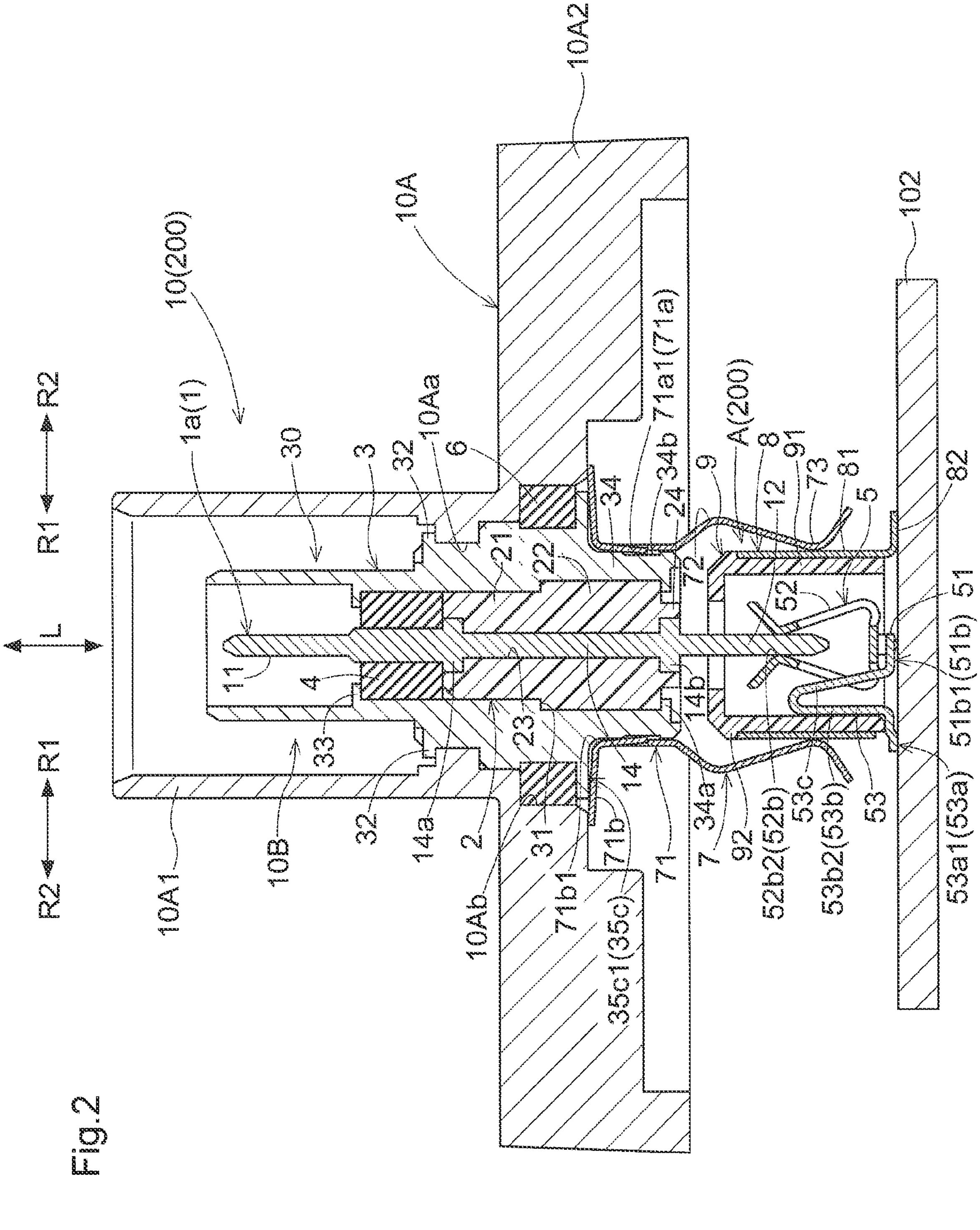
FIG. 2 is a cross-sectional view of a coaxial connector.
Figure 3:
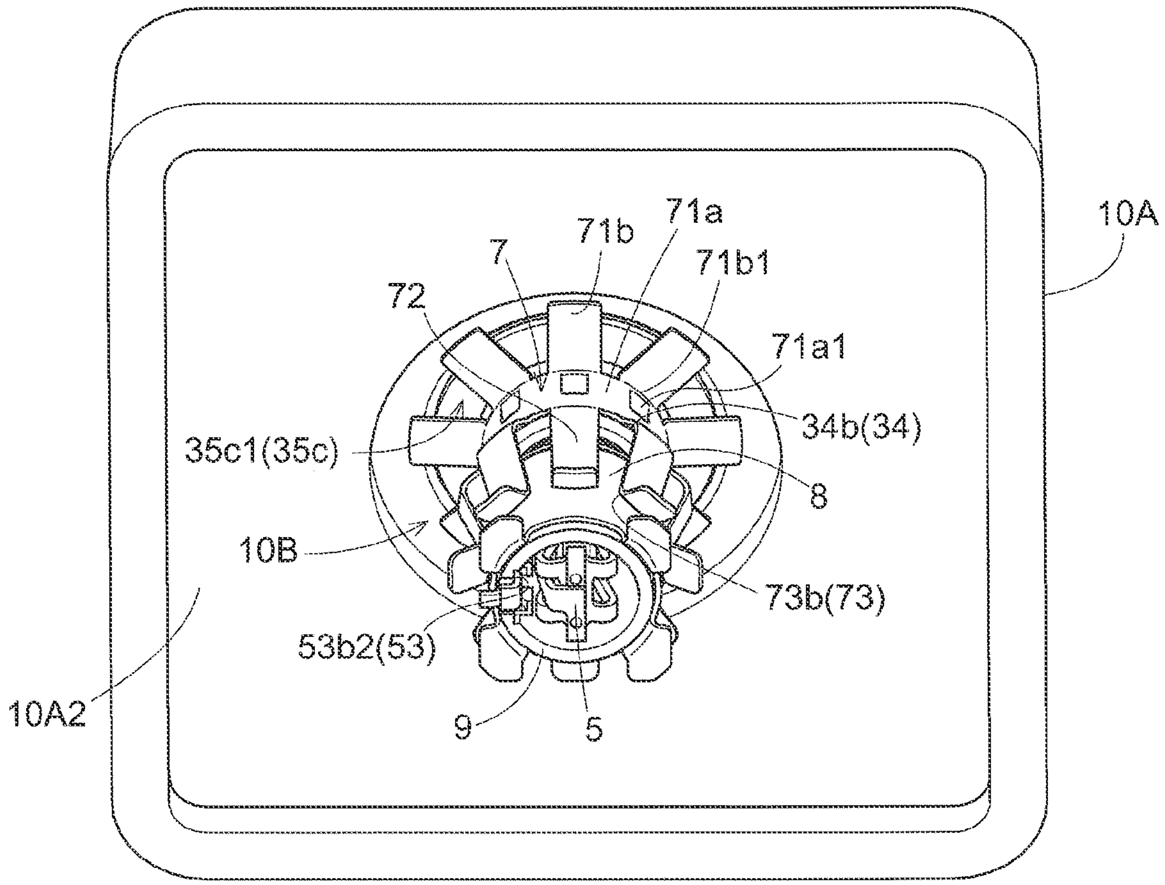
FIG. 3 is a perspective view of the coaxial connector as viewed from the bottom side.
Figure 4:
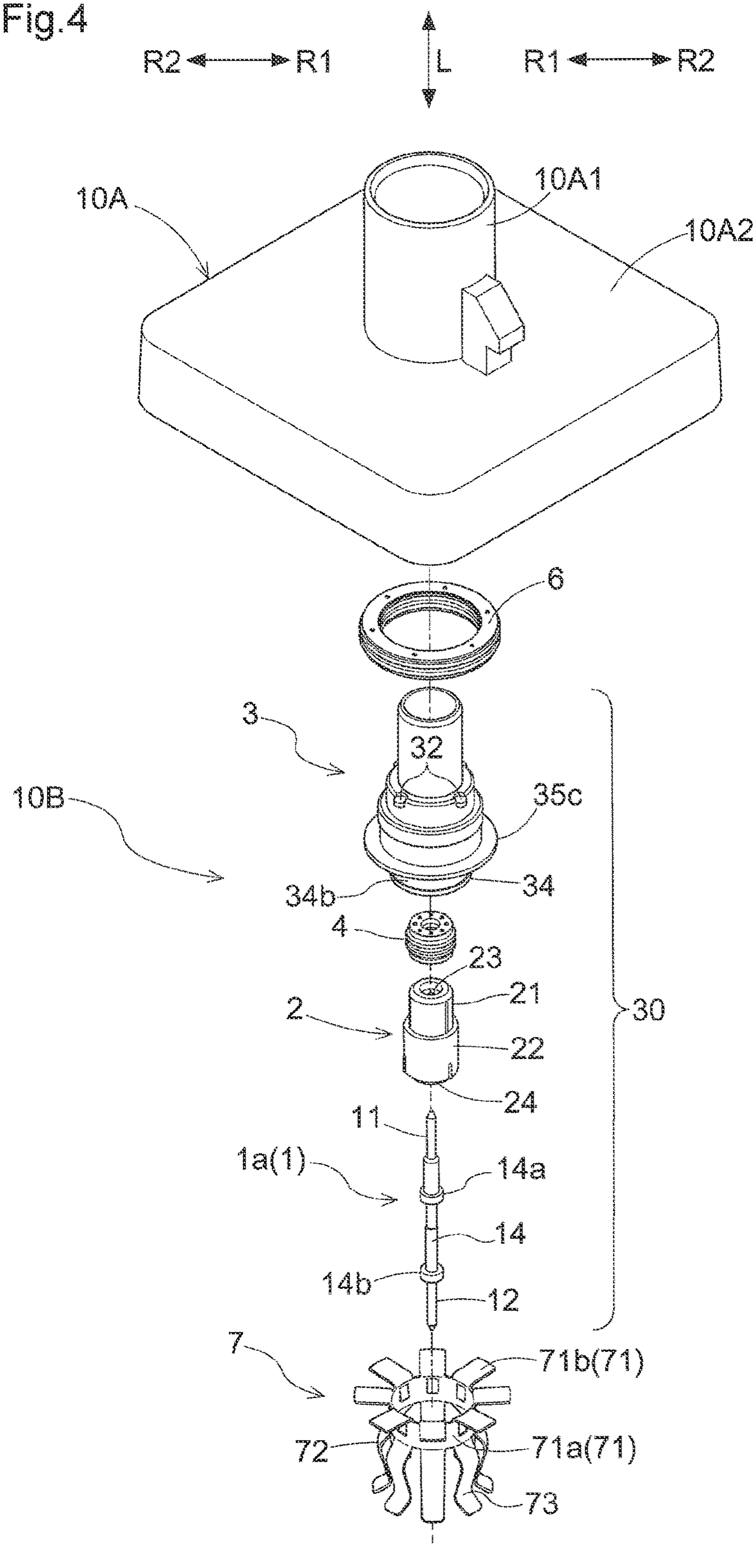
FIG. 4 is an exploded perspective view of a plug.
Figure 5:
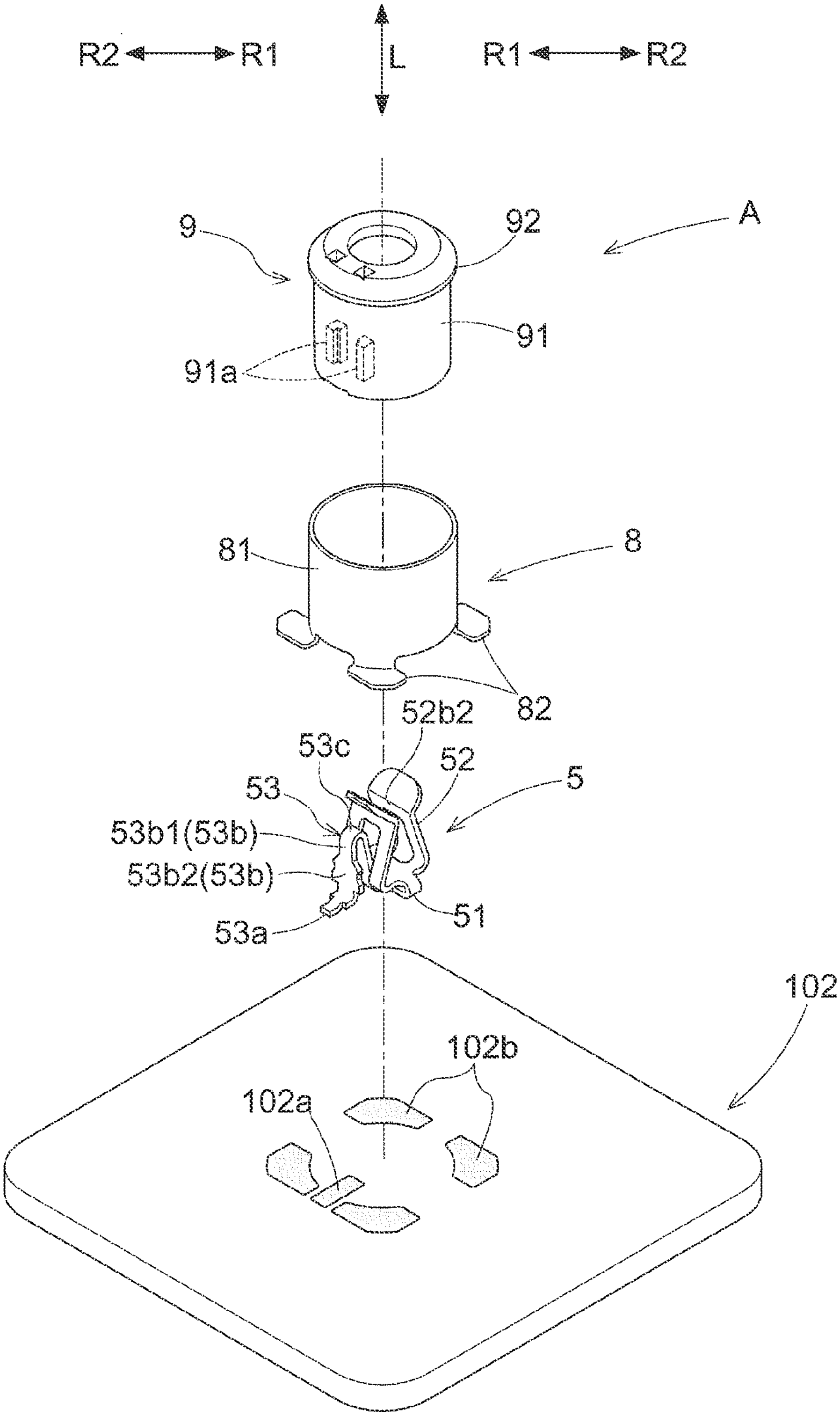
FIG. 5 is an exploded perspective view of a receptacle.
Figure 6:
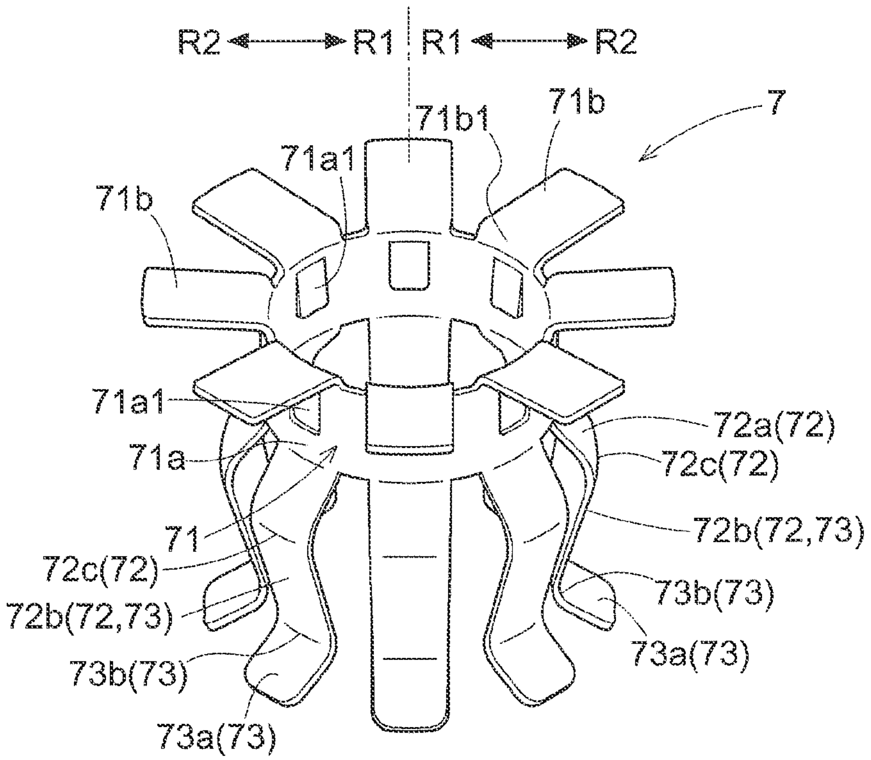
FIG. 6 is a perspective view of a shield member.
Figure 7:
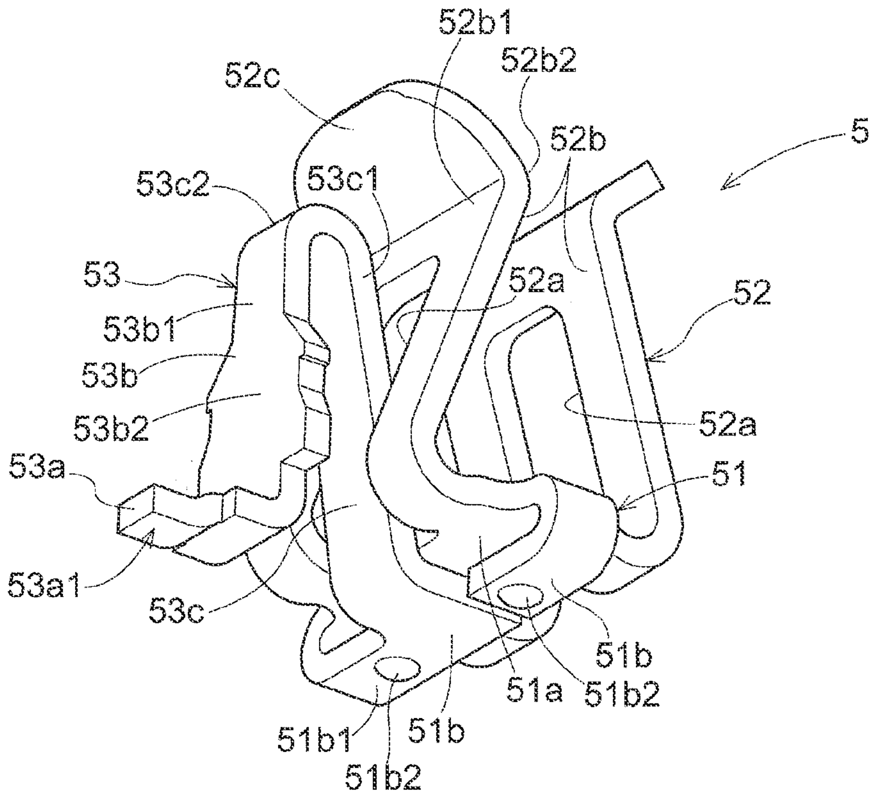
FIG. 7 is a perspective view of a second contact.

FIG. 2 shows a cross-sectional view of the coaxial connector 200, FIG. 3 shows a perspective view of the coaxial connector 200, and FIGS. 4 and 5 show exploded perspective views of the plug unit 10 and the receptacle A. FIG. 6 shows a perspective view of a shield member 7, and FIG. 7 shows a perspective view of a second contact 5. As shown in FIG. 2, the coaxial connector 200 includes the plug 10B and the receptacle A.

The plug unit 10 includes a plug case 10A and a plug 10B inserted into the plug case 10A. The plug case 10A and the main body case 90 (see FIG. 1) are fixed by a plurality of bolts (not shown), laser welding, or the like. As shown in FIGS. 2 and 4, the plug 10B includes a terminal module 30, an outer seal member 6, and the shield member 7. The terminal module 30 includes a first contact 1, a holder 2, a first tubular shell 3, and an inner seal member 4. The terminal module 30 has functionality similar to that of the coaxial cable 120. The first contact 1 corresponds to the inner conductor of the coaxial cable 120, the holder 2 corresponds to the dielectric (insulator) of the coaxial cable 120, and the first tubular shell 3 corresponds to the outer conductor of the coaxial cable 120.

The plug case 10A is a case for accommodating the plug 10B. As shown in FIG. 1, the plug case 10A is located behind the camera module 110 inside the camera unit 100, and is therefore sometimes referred to as a rear case. The main body case 90 is sometimes referred to as a front case, relative to the rear case, in the camera unit 100. The plug case 10A and the main body case 90 are coupled to each other by a plurality of bolts, laser welding, or the like, and together form a storage space for the terminal module 30, the outer seal member 6, the shield member 7, and the receptacle A.

The shield member 7 shields the space inside the shield member 7 from electromagnetic waves propagating outside of the shield member 7. The shield member 7 covers at least a portion of the receptacle A of the camera module 110 and shields the electronic circuit of the substrate 102 from electromagnetic waves such as electromagnetic noise. The shield member 7 is connected to a ground terminal of the substrate 102. The outer conductor of the coaxial cable 120 described above is electrically connected to the first tubular shell 3 of the terminal module 30. Also, as will be described later, the shield member 7 and the first tubular shell 3 of the terminal module 30 are electrically connected to each other. Accordingly, when the shield member 7 is electrically connected to the ground terminal of the substrate 102, the first tubular shell 3 and the outer conductor of the coaxial cable 120 are also electrically connected to the ground terminal of the substrate 102.

Hereinafter, the plug unit 10 will be described in detail with reference to FIGS. 2, 4, and 6.

As described above, the plug unit 10 includes the plug case 10A and the plug 10B. The plug 10B includes the terminal module 30, the outer seal member 6, and the shield member 7. Also, the terminal module 30 includes the first contact 1, the holder 2, the first tubular shell 3, and the inner seal member 4.

As shown in FIGS. 2 and 4, the first contact 1 is a rod-shaped conductor that transmits a signal. In this embodiment, the first contact 1 is constituted by only a straight portion 1*a*, and the extending direction of the first contact 1 will be referred to as a first direction L below. Also, the direction orthogonal to the first direction L will be referred to as the radial direction, the direction toward the first contact 1 in the radial direction will be referred to as a radially inward direction R1, and the direction away from the first contact 1 will be referred to as a radially outward direction R2.

The holder 2 is a cylindrical member in which a through hole 23, through which the first contact 1 passes, is provided in the center of a cylindrical insulator, and the holder 2 supports the first contact 1 inserted therein. The holder 2 is formed by an insulating (non-conductive) material such as a resin in order to electrically insulate the first contact 1 from the outside. The length of the holder 2 in the first direction L is shorter than that of the first contact 1. Accordingly, the holder 2 covers a central portion 14 of the first contact 1 in the first direction L while supporting the first contact 1. In other words, the two ends of the first contact 1 are not covered by the holder 2, and are exposed as a first terminal portion 11 and a second terminal portion 12. The first terminal portion 11 is arranged on the coaxial cable 120 side, and the second terminal portion 12 is arranged on the receptacle A side. Although an exploded perspective view is shown in FIG. 4 for convenience, the first contact 1 is insert-molded in the holder 2. A first annular projection portion 14*a* and a second annular projection portion 14*b*, which project in the radially outward direction R2, are formed at respective end portions of the central portion 14 covered by the holder 2. In this way, the annular projecting portions 14*a* and 14*b* are formed at the end portions of the central portion 14 of the first contact 1, and the central portion 14 is integrated with the holder 2 by insert molding, and thus the first contact 1 is reliably prevented from coming out of the holder 2. In this way, the straight portion 1*a* of the first contact 1 is constituted by the first terminal portion 11, the second terminal portion 12, and the central portion 14.

The holder 2 is a cylindrical member that includes a first main body portion 21 located on the first terminal portion 11 side, a second main body portion 22 that has a larger diameter than the first main body portion 21 and is located on the second terminal portion 12 side, and an annular step portion 24 formed by reducing the diameter of an end portion of the second main body portion 22. As shown in FIG. 2, the holder 2 is inserted into the first tubular shell 3, and then the lower end face of the second main body portion 22, which is adjacent to the annular step portion 24, abuts against locking projections 34_a_ formed by pressing portions of the first tubular shell 3 in the radially inward direction R1, and thus the holder 2 is prevented from coming out of the first tubular shell 3.

The first tubular shell 3 is a cylindrical conductive member that covers the radially outward direction R2 side of the holder 2, and includes a tubular end portion 34 that is exposed from the plug case 10A. A plurality of locking projections 34_a_ are formed on the inner circumferential surface of the tubular end portion 34, and these locking projections 34_a_ abut against the lower end face of the second main body portion 22 of the holder 2. An annular extending portion 33, which extends annularly from the inner circumferential surface in the radially inward direction R1, is formed in a portion of the first tubular shell 3 on the first terminal portion 11 side. Also, a retracted step portion 31 that is annularly retracted (increases in diameter) from the inner circumferential surface in the radially outward direction R2 is formed in a portion of the first tubular shell 3 on the second terminal portion 12 side. The upper end face of the second main body portion 22 of the holder 2 abuts against the retracted step portion 31, and the plurality of locking projections 34_a_ abut against the lower end face of the second main body portion 22, and thus the holder 2 is fixed to the first tubular shell 3. The retracted step portion 31 in this embodiment is formed by cutting the inner circumferential surface of the first tubular shell 3. Also, the first tubular shell 3 includes a plurality of (four in this embodiment) locking ribs 32 formed by pressing portions of the first tubular shell 3 in the radially outward direction R2 after the first tubular shell 3 has been inserted into the plug case 10A. Due to the locking rib 32 engaging with an annular protrusion portion 10Aa of the plug case 10A, the first tubular shell 3 is prevented from coming out of the plug case 10A. Also, the tubular end portion 34 of the first tubular shell 3 is provided with an annular recession portion 34_b_ that is annularly recessed from the outer circumferential surface in the radially inward direction R1, and an annular portion 35_c_ that projects in the radially outward direction R2 at a position adjacent to the annular recession portion 34_b_ on the outer seal member 6 side.

The inner seal member 4 seals the terminal module 30 to prevent the intrusion of a liquid or the like. The inner seal member 4 is an annular member that has elasticity (i.e., an elastic member). The inner seal member 4 is disposed in the terminal module 30 due to the surface on one side in the first direction L being retained by the annular extending portion 33 and the other surface being retained by the end face of the holder 2 on the first direction L side.

In this way, in the terminal module 30, one side of the inner seal member 4 is abutted against the annular extending portion 33, the holder 2 supporting the first contact 1 is abutted against the other side of the inner seal member 4, and the holder 2 is sandwiched between the retracted step portion 31 of the first tubular shell 3 and the locking projections 34_a_. In other words, in the terminal module 30, the inner seal member 4 and the holder 2 are arranged at predetermined positions in the direction along the first direction L while being sandwiched between the annular extending portion 33 and the locking projections 34_a_ of the first tubular shell 3. According to this configuration, the first tubular shell 3 is inserted into the cylindrical space of the plug case 10A, and then the annular protrusion portion 10Aa of the plug case 10A engages with the locking ribs 32 formed by pressing portions of the first tubular shell 3 in the radially outward direction R2, and thus the terminal module 30 is attached to the plug case 10A.

The plug case 10A is a case for accommodating the terminal module 30 and the outer seal member 6, and supports the terminal module 30 (first tubular shell 3) inserted therein. Since the outer surface of the terminal module 30 is the conductive first tubular shell 3, in order to electrically insulate the first tubular shell 3 from the outside of the plug unit 10, the plug case 10A is formed by an insulating (non-conductive) material such as a resin or a metal material that can dissipate heat inside the camera module 110.

The plug case 10A has a cylindrical tubular portion 10A1 and a block portion 10A2 that projects in the radially outward direction R2 from the tubular portion 10A1 with a rectangular shape in a plan view. A circular annular protrusion portion 10Aa that projects in the radially inward direction R1 is provided on the inner circumferential surface of the tubular portion 10A1. As described above, the annular protrusion portion 10Aa engages with the locking ribs 32 of the first tubular shell 3.

A seal recessed portion 10Ab, into which the outer seal member 6 is mounted, is formed in the inner circumferential surface of the block portion 10A2. The outer seal member 6 is arranged so as to be sandwiched between the seal recessed portion 10Ab, which is the bottom portion of the plug case 10A in the first direction L, and the annular portion 35_c_ of the first tubular shell 3. Similarly to the inner seal member 4, the outer seal member 6 is also an annular member that has elasticity (i.e., an elastic member).

The inner seal member 4 described above comes into contact with the inner circumferential surface of the first tubular shell 3 and the outer circumferential surface of the first contact 1, and the outer seal member 6 comes into contact with the inner circumferential surface of the plug case 10A and the outer circumferential surface of the first tubular shell 3, thus suppressing the intrusion of a liquid into the cylindrical space in the plug case 10A. In the case where the plug unit 10 is used with the camera unit 100 serving as a vehicle-mounted camera as in this embodiment, such sealing performed using the inner seal member 4, the outer seal member 6, and the like is effective. In the case of being a vehicle-mounted camera, the camera unit 100 is often used for driving support and drive state recording, for example. In such cases, the camera unit 100 is often disposed on the exterior of the vehicle, such as on a bumper or a door. The exterior of the vehicle is often exposed to rain, snow, water droplets from puddles on the road, and the like. Accordingly, if the plug unit 10 is made waterproof by employing the sealing described above, the camera unit 100 is suitable for mounting on the exterior of a vehicle, such as on a bumper or a door.

As shown in FIGS. 2 to 4 and 6, the shield member 7 includes a tubular portion 71 that comes into contact with the first tubular shell 3, elastically deformable first curved portions 72 that curve in the radially outward direction R2 from the tubular portion 71, and second curved portions 73 that curve in the radially inward direction R1 from the first curved portions 72. The shield member 7 shields the space inside the shield member 7 from electromagnetic waves in the space outside of the shield member 7, such as electromagnetic noise that affects signals transmitted by the first contact 1 and the electronic circuit of the substrate 102 of the camera module 110. Accordingly, the shield member 7 is also formed by a conductive material such as a metal.

As shown in FIG. 2, the cylindrical portion 71 includes a cylindrical main body 71_a_ that abuts against the annular recession portion 34_b_ of the tubular end portion 34 of the first tubular shell 3, and a plurality of (eight in this embodiment) bent pieces 71*b* that curve in the radially outward direction R2 from one end of the cylindrical main body 71*a*. The cylindrical main body 71*a* is provided with a plurality of (eight in this embodiment) extruded protrusion portions 71*a*1 extruded by pressing the cylindrical main body 71*a* in the radially inward direction R1 so as to come into contact with the outer circumferential surface of the annular recession portion 34*b* of the tubular end portion 34. These extruded protrusion portions 71*a*1 are arranged at equal intervals in the circumferential direction so as to correspond to the bent pieces 71*b*. As shown in FIG. 3, the end portions of the bent pieces 71*b* come into contact with the opening-side inner end face of the block portion 10A2 in the metal plug case 10A. Note that if the plug case 10A is made of a resin, the bent pieces 71*b* are shortened such that the tips of the bent pieces 71*b* come into contact with an exposed surface 35*c*1 of the annular portion 35*c* of the first tubular shell 3.

The other end of the cylindrical main body 71*a* and the connection portions 71*b*1 between the cylindrical main body 71*a* and the bent pieces 71*b* are in close contact with the outer surface of the tubular end portion 34, and the end portions of the bent pieces 71*b* come into contact with the opening-side inner end face of the plug case 10A, and thus the shield member 7 is locked to the first tubular shell 3 (see FIG. 2 as well). At this time, the extruded protrusion portions 71*a*1 come into contact with the outer circumferential surface of the annular recession portion 34*b* of the tubular end portion 34, thus preventing the shield member 7 from coming out. In this way, the bent pieces 71*b* come into contact with the plug case 10A, and the cylindrical main body 71*a*, which includes the extruded protrusion portions 71*a*1, comes into contact with the outer surface of the tubular end portion 34, and thus the plug case 10A, the first tubular shell 3, and the shield member 7 are electrically connected while being engaged with each other.

As shown in FIG. 6, a plurality of (eight in this embodiment) the first curved portions 72 extend with a strip-like shape so as to curve in the radially outward direction R2 from the other end of the cylindrical main body 71*a*, and a plurality of (eight in this embodiment) the second curved portions 73 have a strip-like shape and are continuous with the respective first curved portions 72. The first curved portions 72 each include a first inclined portion 72*a* that extends in the radially outward direction R2 from the cylindrical portion 71, a second inclined portion 72*b* that extends in the radially inward direction R1 from the first inclined portion 72*a*, and a protruding curved portion 72*c* that serves as a boundary between the first inclined portion 72*a* and the second inclined portion 72*b*. The second curved portion 73 includes the second inclined portion 72*b*, a third inclined portion 73*a* that extends in the radially outward direction R2 from the second inclined portion 72*b*, and a receding curved portion 73*b* that serves as a boundary between the second inclined portion 72*b* and the third inclined portion 73*a*. The diameter of a virtual circle that connects the receding curved portions 73*b* (the innermost portions of the strips) in the circumferential direction is smaller than the outer diameter of the cylindrical main body 71*a* (cylindrical portion 71).

According to these configurations, the receding curved portions 73*b* of the second curved portions 73 come into contact with the outer circumferential surface of a later-described second tubular shell 8 of the receptacle A, and the shield member 7 and the second tubular shell 8 are electrically contacted with each other (see FIG. 3 as well). At this time, since the strips of the shield member 7 can undergo elastic deformation so as to spread outward due to the first curved portions 72, all of the second curved portions 73 are constantly electrically connected to the second tubular shell 8.

As shown in FIGS. 2 and 5, the receptacle A includes a second contact 5 that is electrically connected to the substrate 102 and can be electrically connected to the first contact 1 in a coaxial manner (in the first direction L), an insulating case 9 that accommodates the second contact 5, and a conductive second tubular shell 8 that covers the outside of the case 9. Note that the receptacle A may include the substrate 102.

The second contact 5 includes a bottom portion 51 that faces the substrate 102, a pair of plate-shaped standing portions 52 that stand on the bottom portion 51 and are close to each other, and an extension 53 that extends in an inverted U shape from the bottom portion 51 to a position outward of the pair of standing portions 52.

As shown in FIG. 7, the bottom portion 51 has a double-piece structure including a plate-shaped main body 51*a* that has an elongated plate rectangular shape, and a pair of bent portions 51*b* obtained by the two end portions of the plate-shaped main body 51*a* being bent inward. The plate-shaped main body 51*a* is provided with the pair of standing portions 52 by bending the pair of lateral sides, and the standing portions 52 are each provided with a U-shaped notch 52*a*, and therefore the standing portions 52 stand on the two ends of the pair of lateral sides. The extension 53 is provided at the end portion of one of the bent portions 51*b*, and bends and stands in the same direction as the standing portions 52. Bottom faces 51*b*1 of the pair of bent portions 51*b* face the substrate 102, and a hemispherical projection 51*b*2 is formed on each of the two bottom faces 51*b*1. Note that the hemispherical projections 51*b*2 may have any shape as long as the outer surface is arcuate.

The pair of standing portions 52 are plate-shaped, have symmetrical shapes, and stand on the plate-shaped main body 51*a* and are close to each other. Each of the standing portions 52 includes a pair of arm portions 52*b* that extend from respective end portions of a corresponding lateral side of the plate-shaped main body 51*a*, and a bent portion 52*c* that bends outward from a connection end portion 52*b*1 of the pair of arm portions 52*b*. Contact portions 52*b*2 for contact with the first contact 1 are formed on the inner surfaces of the pair of connection end portions 52*b*1, and these contact portions 52*b*2 are given a wide shape (each of these contact portions 52*b*2 is wider in the direction orthogonal to the first direction L than a diameter of the second terminal portion 12 of the first contact 1) so as to be able to clamp the second terminal portion 12 (end portion) of the first contact 1. Note that the width of the contact portions 52*b*2 is set such that electrical connection with the first contact 1 can be ensured if relative misalignment between the plug 10B and the receptacle A is within an allowable range.

In each of the standing portions 52, a U-shaped notch 52*a* is formed between the pair of arm portions 52*b*. A portion of the extension 53 passes through the notch 52*a* of one of the standing portions 52. It should be noted that the extension 53 may be provided so as to pass through the notch 52*a* of the other standing portion 52, or a pair of extensions 53 may be provided so as to pass through the notches 52*a* of both of the standing portions 52.

The extension 53 includes a tip portion 53*a* that is fixed to the substrate 102, a hold portion 53*b* that is held by the case 9, and an elastic portion 53*c* that is elastically deformable.

The tip portion 53*a* bends outward from the hold portion 53*b* and includes a fixing surface 53*a*1 that is fixed to a signal electrode 102*a* of the substrate 102 by soldering or the like (see FIG. 5 as well). The hold portion 53*b* includes a straight portion 53*b*1 that bends from the elastic portion 53*c* toward the substrate 102, and a wide portion 53*b*2 that is wider than the tip portion 53*a* side of the straight portion 53*b*1. The extension 53 is held in the case 9 by the wide portion 53*b*2 being press-fitted into the case 9 (see FIG. 3 as well). Projecting ends of the pair of hemispherical projections 51*b*2 formed on the pair of bottom faces 51*b*1 of the bottom portion 51 of the second contact 5 are located in the same plane as the fixing surface 53*a*1 of the tip portion 53*a* that is fixed to the substrate 102 (see FIG. 2 as well).

The elastic portion 53*c* can undergo elastic deformation in a direction orthogonal to the extending direction of the contact portions 52*b*2. The elastic portion 53*c* includes an extending portion 53*c*1 that extends from one of the bent portions 51*b* along the standing direction of the standing portions 52, and a folded portion 53*c*2 that is folded back from the extending portion 53*c*1, and the folded portion 53*c*2 is connected to the straight portion 53*b*1. Due to the extending portion 53*c*1 being inclined and the folded portion 53*c*2 having an R shape, the extension 53 has an inverted U shape. The extending portion 53*c*1 passes through the notch 52*a* of one of the standing portions 52.

As shown in FIG. 5, the case 9 includes a cylindrical portion 91 and an annular flange 92 that projects outward with an annular shape from an end portion of the cylindrical portion 91. A pair of holding walls 91*a* that project inward with an L shape are formed on a portion of the inner wall of the cylindrical portion 91 that faces the extension 53. The extension 53 is held in the case 9 due to the wide portion 53*b*2 of the hold portion 53*b* being press-fitted between the holding walls 91*a*. While the hold portion 53*b* is fitted between the holding walls 91*a*, the positions of the tip portion 53*a* and the hold portion 53*b* are fixed, and the elastic portion 53*c* can undergo elastic deformation in a direction orthogonal to the extending direction of the contact portions 52*b*2. The annular flange 92 prevents movement of the second tubular shell 8 by abutting against the upper end of the second tubular shell 8 (see FIG. 2).

The second tubular shell 8 includes a cylindrical tubular main body 81 and a plurality of (four in this embodiment) bent pieces 82 that are bent outward from the lower end of the tubular main body 81. The tubular main body 81 covers the cylindrical portion 91 of the case 9, and the upper end abuts against the annular flange 92. The shield member 7 and the second tubular shell 8 are electrically connected by the outer circumferential surface of the tubular main body 81 coming into contact with the second curved portions 73 of the shield member 7 (see FIG. 2 as well). The bent pieces 82 are respectively fixed to ground electrodes 102*b* of the substrate 102 by soldering or the like. According to these configurations, the shield member 7 is electrically connected to the ground terminal of the substrate 102 via the second tubular shell 8, and the first tubular shell 3 and the outer conductor of the coaxial cable 120 are also electrically connected to the ground terminal of the substrate 102 (see FIGS. 1 and 2 as well). As a result, the space inside the second tubular shell 8 is shielded from electromagnetic waves such as electromagnetic noise that affects signals transmitted by the first contact 1 and the second contact 5 and affects the electronic circuit of the substrate 102 of the camera module 110, for example.

The coaxial connector 200 may include the plug unit 10, in which the terminal module 30 and the shield member 7 are accommodated and fixed in the plug case 10A, and the receptacle A electrically connected to the plug unit 10. Also, the coaxial connector 200 may have a configuration in which the plug unit 10 and the receptacle A further include the substrate 102 and the main body case 90. However, if the main body case 90 is included, the camera module 110 can possibly be accommodated in the main body case 90. In this case, the coaxial connector 200 is substantially synonymous with the camera unit 100. Accordingly, the coaxial connector 200 can correspond to an assembly of the terminal module 30 and the receptacle A accommodated in the plug case 10A, an intermediate assembly further including the main body case 90, or the camera unit 100 further accommodating the camera module 110.

Assembly Procedure

As shown in FIG. 4, the outer seal member 6, the terminal module 30, and the shield member 7 are assembled in this order from the opening side of the block portion 10A2 of the plug case 10A, thus manufacturing the plug unit 10. When performing this assembly, the terminal module 30 is inserted into the plug case 10A, and then the locking ribs 32, which are formed by pressing portions of the first tubular shell 3 in the radially outward direction R2, engage with the annular protrusion portion 10Aa of the plug case 10A, and thus the outer seal member 6 abuts against the annular portion 35*c* of the first tubular shell 3 and is locked (see FIG. 2 as well). At this time, the extruded protrusion portions 71*a*1 come into contact with the outer circumferential surface of the annular recession portion 34*b* of the tubular end portion 34, thus preventing the shield member 7 from coming off of the first tubular shell 3. In this way, the plug unit 10 is configured to be very easy to assemble.

As shown in FIG. 5, after the second tubular shell 8 is attached to the case 9, the wide portion 53*b*2 of the hold portion 53*b* of the second contact 5 is press-fitted between the holding walls 91*a* of the case 9, and thus the second contact 5 is accommodated in the case 9. Then, the tip portion 53*a* of the second contact 5 is fixed to the substrate 102, and the bent pieces 82 of the second tubular shell 8 are fixed to the substrate 102. In this way, the receptacle A is configured to be very easy to assemble.

Figure 8:
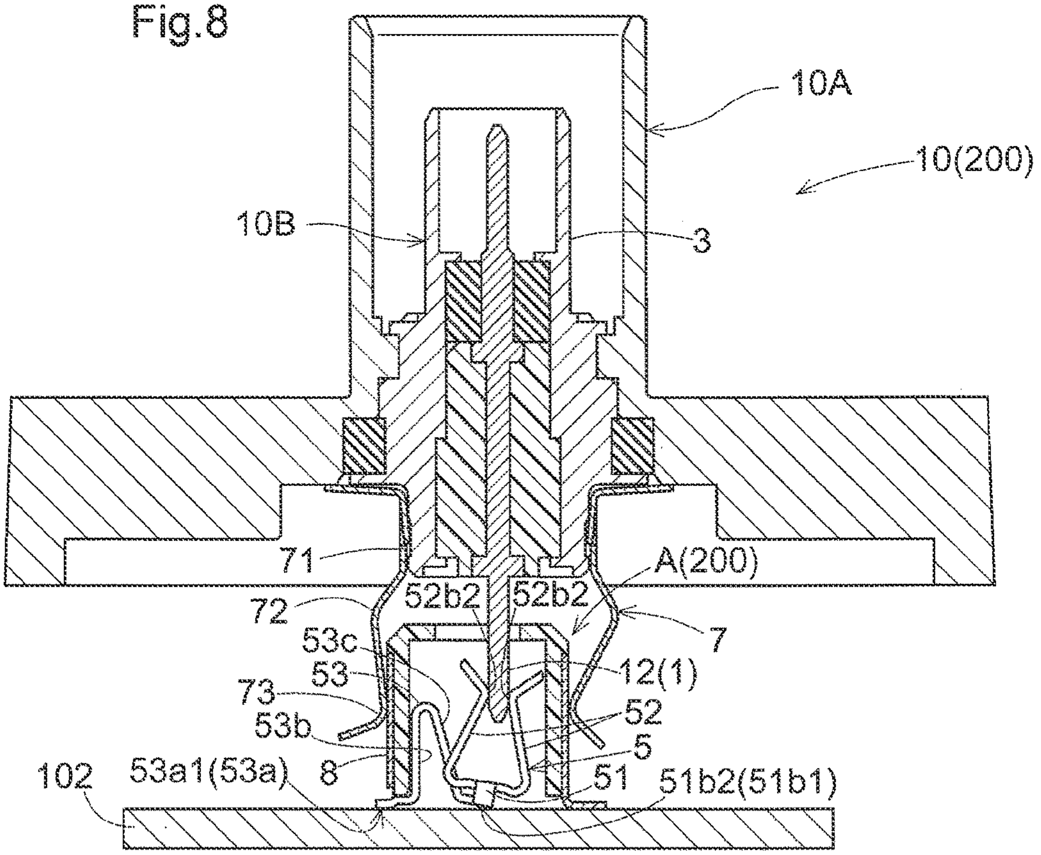
FIG. 8 is a diagram showing a state in which the receptacle is misaligned leftward and downward relative to the plug.
Figure 9:
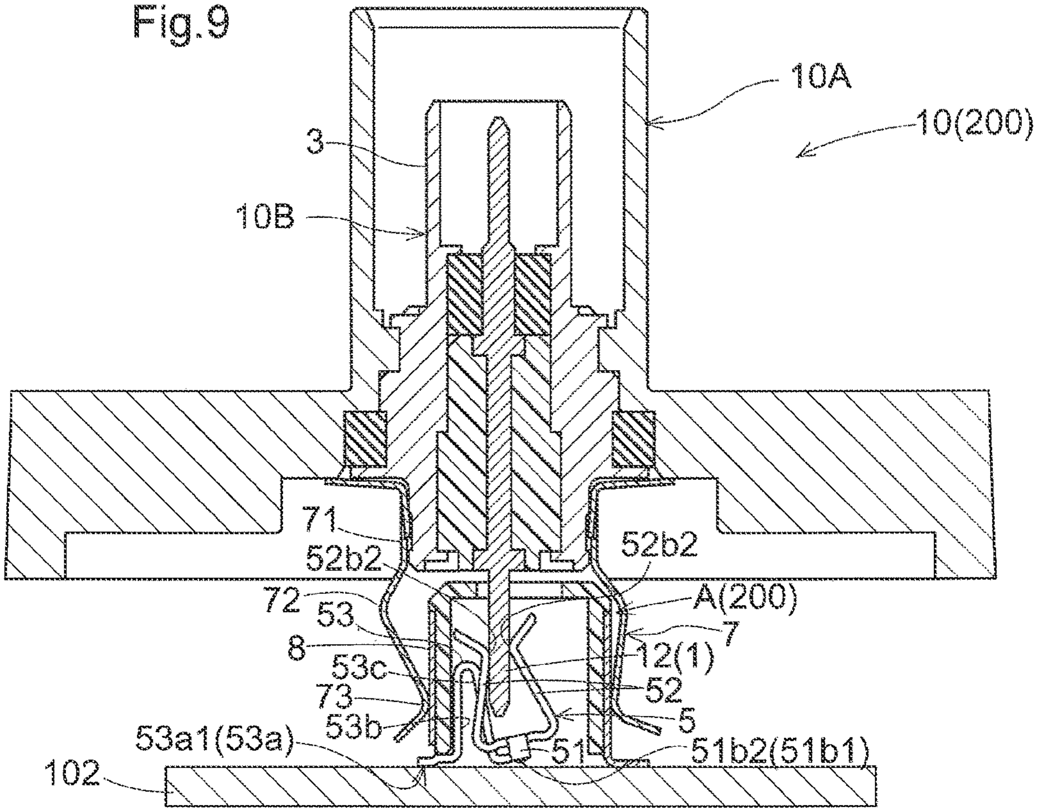
FIG. 9 is a diagram showing a state in which the receptacle is misaligned rightward and upward relative to the plug.

FIGS. 8 to 9 show states of electrical connection between the receptacle A and the plug unit 10. FIG. 8 shows a state in which the receptacle A is connected in a state of being misaligned by 0.5 mm downward and leftward relative to the plug unit 10. FIG. 9 shows a state in which the receptacle A is connected in a state of being misaligned by 0.5 mm upward and rightward relative to the plug unit 10.

In the state shown in FIG. 8, force that causes the pair of standing portions 52 to move rightward is applied to the second contact 5 by the second terminal portion 12 of the first contact 1. At this time, the pair of standing portions 52 tilt to the right while the elastic portion 53*c* elastically deforms in a direction away from the hold portion 53*b*. Even if the elastic portion 53*c* undergoes deformation, the hemispherical projections 51*b*2 at the bottom portion 51 of the second contact 5 slide smoothly over the substrate 102, and the tip portion 53*a* of the extension 53 fixed to the substrate 102 is not likely to be subjected to stress causing peeling from the substrate 102. Also, the first curved portions 72 of the shield member 7 deform flexibly, and the second curved portions 73 remain entirely abutted against the second tubular shell 8, and thus high-frequency signals propagating through the contacts 1 and 5 do not leak, the signal quality does not degrade, and high shielding performance is ensured. Also, during downward movement, the hemispherical projections 51*b*2 of the bottom portion 51 of the second contact 5 abut against the substrate 102, and the second terminal portion 12 of the first contact 1 can be reliably clamped between the contact portions 52*b*2 formed on the pair of standing portions 52 of the second contact 5, without the second contact 5 moving away downward. Also, although not shown, during movement in the extending direction of the contact portions 52*b*2, the second terminal portion 12 of the first contact 1 can be reliably clamped between the wide contact portions 52*b*2.

In the state shown in FIG. 9, force that causes the pair of standing portions 52 to move leftward is applied to the second contact 5 by the second terminal portion 12 of the first contact 1. At this time, the pair of standing portions 52 tilt to the left while the elastic portion 53*c* elastically deforms in a direction toward the hold portion 53*b*. The elastic portion 53*c* flexibly deforms such that the bottom portion 51 of the second contact 5 moves away from the substrate 102, and the tip portion 53*a* of the extension 53 fixed to the substrate 102 is not likely to be subjected to stress causing peeling. Also, the first curved portions 72 of the shield member 7 deform flexibly, and the second curved portions 73 remain entirely abutted against the second tubular shell 8, and thus high-frequency signals propagating through the contacts 1 and 5 do not leak, the signal quality does not degrade, and high shielding performance is ensured. Also, during upward movement, the second terminal portion 12 of the first contact 1 can follow the movement so as to be reliably clamped between the contact portions 52*b*2 formed on the pair of standing portions 52 of the second contact 5. Also, although not shown, during movement in the extending direction of the contact portions 52*b*2, the second terminal portion 12 of the first contact 1 can be reliably clamped between the wide contact portions 52*b*2.

In this embodiment, the contact portions 52*b*2 formed on the pair of standing portions 52 of the second contact 5 have a wide shape that can clamp the second terminal portion 12 (end portion) of the first contact 1, and thus even if the plug 10B and the receptacle A are misaligned relative to each other in the extending direction of the contact portions 52*b*2, electrical connection between the first contact 1 and the second contact 5 can be secured. Also, the elastic portion 53*c* in this embodiment can elastically deform in a direction orthogonal to the extending direction of the contact portions 52*b*2, and therefore even if the plug 10B and the receptacle A are misaligned relative to each other in a direction orthogonal to the extending direction of the contact portions 52*b*2, the elastic portion 53*c* undergoes elastic deformation, and electrical connection between the first contact 1 and the second contact 5 can be secured. Accordingly, even if the plug 10B and the receptacle A are misaligned in various directions, electrical connection between the first contact 1 and the second contact 5 can be reliably secured.

In this way, misalignment in the extending direction of the contact portions 52*b*2 is absorbed by the wide shape of the contact portions 52*b*2, and misalignment in a direction orthogonal to the extending direction of the contact portions 52*b*2 is absorbed by the elastic portion 53*c*, and thus the second contact 5 is not likely to become twisted, and the contact load can be stably ensured. Since this ensuring of the contact load is realized using the shape of the second contact 5, contact performance between the first tubular shell 3 and the shield member 7 does not degrade, and high frequency signals are not likely to leak. Accordingly, it is possible to provide the coaxial connector 200 that can stably secure electrical connection even if there is misalignment between the plug 10B and the receptacle A. Also, a portion of the elastic portion 53*c* passes through the notch 52*a* formed by cutting away a portion of one of the standing portions 52, and thus the coaxial connector 200 can be made compact.

Also, the projecting ends of the pair of hemispherical projections 51*b*2 formed on the bottom faces 51*b*1 of the bottom portion 51 of the second contact 5 are located on the same plane as the fixing surface 53*a*1 of the tip portion 53*a* of the extension 53, and therefore even if the elastic portion 53*c* undergoes deformation, the bottom portion 51 of the second contact 5 remains abutted against the substrate 102, stress is not likely to be applied to the tip portion 53*a* of the extension 53 that is fixed to the substrate 102, and the second terminal portion 12 of the first contact 1 can be reliably clamped between the contact portions 52*b*2. Accordingly, it is possible to stably secure electrical connection even if there is misalignment between the plug 10B and the receptacle A. Due to the hemispherical projections 51*b*2 being provided on the bottom faces 51*b*1 of the bottom portion 51 of the second contact 5, the hemispherical projections 51*b*2 slide smoothly on the substrate 102 when the elastic portion 53*c* undergoes elastic deformation, and it is possible to mitigate stress that is generated due to misalignment between the plug 10B and the receptacle A.

In this embodiment, the shield member 7 of the plug 10B that is in contact with the second tubular shell 8 of the receptacle A is provided with the elastically deformable first curved portions 72 that curve outward, and the second curved portions 73 that curve inward from the first curved portions 72 and can be electrically connected to the second tubular shell 8. Accordingly, even if the first contact 1 and the second contact 5 are electrically connected in a state where the plug 10B and the receptacle Aare misaligned relative to each other, the first curved portions 72 flexibly deform so as to maintain a state in which the second curved portions 73 are entirely abutted against the second tubular shell 8. Accordingly, high shielding performance is ensured, thus preventing the problem of a reduction in signal quality due to the leakage of high frequency signals propagating through the contacts 1 and 5.

Also, the first tubular shell 3 and the cylindrical portion 71 of the shield member 7 are brought into contact with each other, and the plurality of the first curved portions 72 deform more flexibly due to extending from the cylindrical portion 71 with strip-like shapes, and therefore the contact resistance between the shield member 7 and the second tubular shell 8 is uniform, and durability can be improved. Due to the second curved portions 73 also having a strip-like shape and being continuous with the respective first curved portions 72, the second curved portions 73 deform along with the deformation of the first curved portions 72, and a larger area of contact between the shield member 7 and the second tubular shell 8 can be ensured. Moreover, the diameter of a virtual circle connecting the innermost portions of the strips in the circumferential direction is smaller than the outer diameter of the cylindrical portion 71, thus making it possible to appropriately ensure the contact load while also achieving compactness for the coaxial connector 200. In this way, even in the case where the plug 10B and the receptacle A are misaligned relative to each other, if all of the second curved portions 73 are constantly electrically connected to the second tubular shell 8, the shielding performance of the coaxial connector 200 can be improved.

Other Embodiments (1) In the above-described embodiment, a portion of the elastic portion 53*c* passes through the notch 52*a* formed by cutting out a portion of one of the standing portions 52, but the elastic portion 53*c* may be separated from the pair of standing portions 52 within an elastically deformable range.

(2) In the above-described embodiment, the bottom faces 51*b*1 of the bottom portion 51 of the second contact 5 and the fixing surface 53*a*1 of the tip portion 53*a* of the extension 53 are located on the same plane, but the bottom faces 51*b*1 of the bottom portion 51 of the second contact 5 may be arranged higher (farther from the substrate 102) than the fixing surface 53*a*1 of the tip portion 53*a*.

(3) In the above-described embodiment, the shield member 7 of the plug 10B that is in contact with the second tubular shell 8 of the receptacle A is provided with the elastically deformable first curved portions 72 that curve outward, and the second curved portions 73 that curve inward from the first curved portions 72 and can be electrically connected to the second tubular shell 8. Alternatively, at least either the first curved portions 72 or the second curved portions 73 may be formed with a straight shape.

(4) In the above-described embodiment, the first tubular shell 3 and the cylindrical portion 71 of the shield member 7 are brought into contact with each other, and the plurality of the first curved portions 72 extend from the cylindrical portion 71 with strip-like shapes, but a single cylindrical first curved portion 72 may be provided. Also, although the second curved portions 73 also have a strip-like shape and are continuous with the respective first curved portions 72, a single cylindrical second curved portion 73 may similarly be provided.

(5) Although the tubular portion 10A1 of the plug case 10A described above has a cylindrical shape, it may be shaped as a square tube having a polygonal cross-section. Also, although the block portion 10A2 of the plug case 10A has a rectangular shape in a plan view, it may have an annular shape in a plan view or a polygonal shape other than rectangular in a plan view.

The invention claimed is:

1. A coaxial connector comprising:

a plug and a receptacle electrically connectable to each other, the plug including:

a first contact that is electrically conductive and rod-shaped;

a holder that is electrically insulating and supports the first contact inserted therein;

a first tubular shell that is electrically conductive and covers an outer surface of the holder; and a shield member that is electrically conductive, that is in contact with the first tubular shell, and that is configured to shield the first tubular shell from external electromagnetic waves, and the receptacle including:

a second contact that is electrically conductive, that is configured to be electrically connected to a substrate, and that is electrically connectable to the first contact coaxially;

a case that is electrically insulating and accommodates the second contact; and a second tubular shell that is electrically conductive and covers an outer surface of the case, wherein the second contact includes:

a bottom portion that faces the substrate;

a pair of standing portions that are plate-shaped, stand on the bottom portion, and are close to each other; and an extension that has an inverted U shape and extends from the bottom portion to a position outward of a first one of the standing portions, the pair of standing portions include respective contact portions having a wide shape and configured to clamp an end portion of the first contact, the extension includes:

a tip portion configured to be fixed to the substrate;

a hold portion held by the case; and an elastic portion that is elastically deformable, and the elastic portion is elastically deformable in a direction in which the pair of standing contact portions face each other.

2. The coaxial connector according to claim 1, wherein the elastic portion includes a portion through a notch in the first one of the standing portions.

3. The coaxial connector according to claim 1, wherein the bottom portion of the second contact includes a bottom face that faces the substrate and that is located on a plane on which the tip portion of the extension is to be fixed to the substrate.

4. The coaxial connector according to claim 2, wherein the bottom portion of the second contact includes a bottom face that faces the substrate and that is located on a plane on which the tip portion of the extension is to be fixed to the substrate.

5. The coaxial connector according to claim 3, wherein the bottom face of the bottom portion of the second contact includes a hemispherical projection.

6. The coaxial connector according to claim 4, wherein the bottom face of the bottom portion of the second contact includes a hemispherical projection.

7. The coaxial connector according to claim 1, wherein the shield member includes:

at least one first curved portion that is elastically deformable and curves outward; and at least one second curved portion that curves inward from the at least one first curved portion and is electrically connectable to the second tubular shell.

8. The coaxial connector according to claim 2, wherein the shield member includes:

at least one first curved portion that is elastically deformable and curves outward; and at least one second curved portion that curves inward from the at least one first curved portion and is electrically connectable to the second tubular shell.

9. The coaxial connector according to claim 3, wherein the shield member includes:

at least one first curved portion that is elastically deformable and curves outward; and at least one second curved portion that curves inward from the at least one first curved portion and is electrically connectable to the second tubular shell.

10. The coaxial connector according to claim 4, wherein the shield member includes:

at least one first curved portion that is elastically deformable and curves outward; and at least one second curved portion that curves inward from the at least one first curved portion and is electrically connectable to the second tubular shell.

11. The coaxial connector according to claim 5, wherein the shield member includes:

at least one first curved portion that is elastically deformable and curves outward; and at least one second curved portion that curves inward from the at least one first curved portion and is electrically connectable to the second tubular shell.

12. The coaxial connector according to claim 6, wherein the shield member includes:

at least one first curved portion that is elastically deformable and curves outward; and at least one second curved portion that curves inward from the at least one first curved portion and is electrically connectable to the second tubular shell.

13. The coaxial connector according to claim 7, wherein the shield member includes a cylindrical portion in contact with the first tubular shell, and the at least one first curved portion includes a plurality of first curved portions each having a strip shape and extending from the cylindrical portion.

14. The coaxial connector according to claim 8, wherein the shield member includes a cylindrical portion in contact with the first tubular shell, and the at least one first curved portion includes a plurality of first curved portions each having a strip shape and extending from the cylindrical portion.

15. The coaxial connector according to claim 9, wherein the shield member includes a cylindrical portion in contact with the first tubular shell, and the at least one first curved portion includes a plurality of first curved portions each having a strip shape and extending from the cylindrical portion.

16. The coaxial connector according to claim 10, wherein the shield member includes a cylindrical portion in contact with the first tubular shell, and the at least one first curved portion includes a plurality of first curved portions each having a strip shape and extending from the cylindrical portion.

17. The coaxial connector according to claim 11, wherein the shield member includes a cylindrical portion in contact with the first tubular shell, and the at least one first curved portion includes a plurality of first curved portions each having a strip shape and extending from the cylindrical portion.

18. The coaxial connector according to claim 12, wherein the shield member includes a cylindrical portion in contact with the first tubular shell, and the at least one first curved portion includes a plurality of first curved portions each having a strip shape and extending from the cylindrical portion.

19. The coaxial connector according to claim 13, wherein the at least one second curved portion includes a plurality of second curved portions being in a shape of strips and being continuous with the respective first curved portions, and a virtual circle circumferentially connecting respective innermost portions of the strips has a diameter smaller than an outer diameter of the cylindrical portion.

20. The coaxial connector according to claim 19, wherein all of the second curved portions are constantly electrically connected to the second tubular shell.

* * * * *